United States Patent
Liao et al.

(10) Patent No.: US 12,418,747 B2
(45) Date of Patent: Sep. 16, 2025

(54) METHOD AND APPARATUS FOR SWITCHING MAIN MICROPHONE, VOICE DETECTION METHOD AND APPARATUS FOR MICROPHONE, MICROPHONE-LOUDSPEAKER INTEGRATED DEVICE, AND READABLE STORAGE MEDIUM

(71) Applicant: ZHEJIANG HUACHUANG VISION TECHNOLOGY CO., LTD., Hangzhou (CN)

(72) Inventors: Huanzhu Liao, Hangzhou (CN); Qi Zhang, Hangzhou (CN); Guoquan Yang, Hangzhou (CN); Keyan Wang, Hangzhou (CN); Yaxi Cao, Hangzhou (CN); Mingyuan Yu, Hangzhou (CN)

(73) Assignee: ZHEJIANG HUACHUANG VISION TECHNOLOGY CO., LTD., Hangzhou (CN)

( * ) Notice: Subject to any disclaimer, the term of this patent is extended or adjusted under 35 U.S.C. 154(b) by 230 days.

(21) Appl. No.: 18/240,493

(22) Filed: Aug. 31, 2023

(65) Prior Publication Data

US 2023/0412977 A1 Dec. 21, 2023

Related U.S. Application Data

(63) Continuation of application No. PCT/CN2022/079321, filed on Mar. 4, 2022.

(30) Foreign Application Priority Data

Mar. 8, 2021 (CN) .......................... 202110248590.X
Mar. 16, 2021 (CN) .......................... 202110278261.X (51) Int. Cl.
*G10L 25/00* (2013.01)
*G10L 25/21* (2013.01)
(Continued)

(52) U.S. Cl.
CPC .............. *H04R 3/005* (2013.01); *G10L 25/21* (2013.01); *G10L 25/84* (2013.01); *G10L 25/87* (2013.01);
(Continued)

(58) Field of Classification Search
CPC ................................ H04R 3/005; G10L 25/21
See application file for complete search history.

(56) References Cited

U.S. PATENT DOCUMENTS 6,173,059 B1    1/2001  Huang et al.
10,602,276 B1*  3/2020  Kirsch ..................... H04R 5/04
(Continued)

FOREIGN PATENT DOCUMENTS

CN    102165521 A    8/2011
CN    104754430 A    7/2015
(Continued)

OTHER PUBLICATIONS

"Research on Multi-channel Speech endpoint Detection Method based on Neural network", Wang Simeng, Information Science and Technology Series of China Excellent Master's Thesis Full Text Database, 01, pp. 1-44.
(Continued)

*Primary Examiner* — Ibrahim Siddo (57) ABSTRACT

A method and apparatus for switching a main microphone of a plurality of microphones, a voice detection method and apparatus for a microphone, a microphone-loudspeaker integrated device, and a readable storage medium are provided. The method for switching the main microphone of the plurality of microphones includes: acquiring first audio data for playback by a loudspeaker, and acquiring second audio data acquired by each microphone and corresponding noise frequency domain energy; obtaining corresponding first frequency domain energy and second frequency domain
(Continued)

energy according to the first audio data and the second audio data; when the first frequency domain energy is less than a first preset threshold, selecting a candidate main microphone according to the noise frequency domain energy and the second frequency domain energy corresponding to each microphone; and switching the candidate main microphone as a main microphone.

20 Claims, 5 Drawing Sheets

(51) Int. Cl.
    *G10L 25/84* (2013.01)
    *G10L 25/87* (2013.01)
    *H04R 1/40* (2006.01)
    *H04R 3/00* (2006.01)
    *H04R 29/00* (2006.01)

(52) U.S. Cl.
    CPC ........... *H04R 1/406* (2013.01); *H04R 29/005* (2013.01); *H04R 2410/01* (2013.01)

(56) References Cited

U.S. PATENT DOCUMENTS

| | | | |
|---|---|---|---|
| 2005/0271220 A1* | 12/2005 | Bathurst | ............... H04R 1/406 381/91 |
| 2016/0337523 A1 | 11/2016 | Pandey et al. | |
| 2018/0226086 A1 | 8/2018 | Huang et al. | |
| 2019/0349678 A1 | 11/2019 | Janse et al. | |

FOREIGN PATENT DOCUMENTS

| | | |
|---|---|---|
| CN | 108022595 A | 5/2018 |
| CN | 110706693 A | 1/2020 |
| CN | 112614513 A | 4/2021 |
| CN | 112669865 A | 4/2021 |
| WO | WO2018017878 A1 | 1/2018 |

OTHER PUBLICATIONS

International Search Report of PCT/CN2022/079321.
202110248590.A First Office Action.
European search report of EP22766237.6.

* cited by examiner

METHOD AND APPARATUS FOR SWITCHING MAIN MICROPHONE, VOICE DETECTION METHOD AND APPARATUS FOR MICROPHONE, MICROPHONE-LOUDSPEAKER INTEGRATED DEVICE, AND READABLE STORAGE MEDIUM

CROSS-REFERENCE TO RELATED APPLICATIONS

This application is a continuation of international patent application No. PCT/CN2022/079321, filed on Mar. 4, 2022, which itself claims priority to Chinese patent applications No. 202110278261.X, filed on Mar. 16, 2021, titled "METHOD, APPARATUS, DEVICE, AND READABLE STORAGE MEDIUM FOR SWITCHING MAIN MICROPHONE", and No. 202110248590.X, filed on Mar. 8, 2021, titled "VOICE DETECTION METHOD AND APPARAUTS, ELECTRONIC DEVICE AND STORAGE MEDIUM". The contents of the above applications are hereby incorporated by reference.

TECHNICAL FIELD

The present disclosure generally relates to a field of signal processing and voice detection technology, and in particular, to a method and apparatus for switching a main microphone of a plurality of microphones, a voice detection method and apparatus for a microphone, a microphone-loudspeaker integrated device, and a readable storage medium.

BACKGROUND

As 5G networks become more and more popular, demand for network video conferencing is increasing. In the network video conferencing, a video conferencing terminal and a teleconferencing terminal are usually used together with a microphone-loudspeaker integrated device. The microphone-loudspeaker integrated device has multiple microphones and a loudspeaker. A function of the microphone-loudspeaker integrated device is to receive sound, play the received sound by the loudspeaker, and acquire a local voice by the microphone. A conventional switching scheme for a main microphone is to calculate root-mean-square (RMS) values of strength of signals picked up by microphones, select a candidate main microphone after comparing RMS values with each other, and switch the candidate main microphone to be the main microphone. However, in this method, the main microphone switching does not consider whether the loudspeaker is playing audio data or not, which can easily lead to a selection of the microphone with a strongest echo signal as the main microphone, and does not take into account a noise of the microphone, which can easily lead to the selected main microphone being the noisiest microphone.

SUMMARY

In a first aspect, according to various embodiments of the present disclosure, a method for switching a main microphone of a plurality of microphones is provided. The method includes: acquiring first audio data for playback by a loudspeaker, and acquiring second audio data acquired by each microphone and noise frequency domain energy corresponding to each microphone; preprocessing the first audio data and the second audio data, obtaining corresponding first frequency domain data and second frequency domain data; calculating first frequency domain energy of the first frequency domain data and second frequency domain energy of the second frequency domain data; when the first frequency domain energy is less than a first preset threshold, selecting a candidate main microphone from the plurality of microphones according to the noise frequency domain energy and the second frequency domain energy corresponding to each microphone; and when the candidate main microphone is different from the current main microphone, switching the candidate main microphone as the main microphone.

In some embodiments, when acquiring the first audio data for playback by the loudspeaker, a frame number of acquired audio data is 1; and when acquiring the second audio data acquired by each microphone, a frame number of acquired audio data is 1.

In some embodiments, acquiring the noise frequency domain energy corresponding to each microphone includes: for each microphone, when a frame number of audio data that have been acquired by the microphone is greater than or equal to a preset number, determining the newest frames of the audio data that have been acquired with the preset number, preprocessing each frame of the newest frames of the audio data to obtain corresponding third frequency domain data, calculating third frequency domain energy of the third frequency domain data, and taking a minimum third frequency domain energy as the noise frequency domain energy corresponding to the microphone.

In some embodiments, when the first frequency domain energy is less than the first preset threshold, selecting the candidate main microphone from the plurality of microphones according to the noise frequency domain energy and the second frequency domain energy corresponding to each microphone includes: when the first frequency domain energy is less than the first preset threshold, and at least one of the second frequency domain energy is greater than a second preset threshold, calculating a signal-to-noise ratio corresponding to each microphone based on the noise frequency domain energy and the second frequency domain energy corresponding to each microphone, and selecting a microphone with a maximum signal-to-noise ratio as the candidate main microphone; or, when the first frequency domain energy is less than the first preset threshold, and each of the second frequency domain energy is less than the second preset threshold, selecting a microphone with minimum noise frequency domain energy as the candidate main microphone.

In some embodiments, when the candidate main microphone is different from the current main microphone, and before switching the candidate main microphone as the main microphone, the method further includes: updating a count corresponding to the candidate main microphone to the current count plus one; when the updated count reaches a threshold, switching the candidate main microphone to the main microphone; when the updated count is less than the threshold, returning to perform steps of acquiring the first audio data for playback by the loudspeaker, and acquiring the second audio data acquired by each microphone and the noise frequency domain energy corresponding to each microphone.

In some embodiments, after switching the candidate main microphone as the main microphone, the method further includes: resetting the count corresponding to each candidate main microphone other than the main microphone, and returning to perform steps of acquiring the first audio data for playback by the loudspeaker, and acquiring the second audio data acquired by each microphone and the noise frequency domain energy corresponding to each microphone.

In some embodiments, the method further includes: when the first frequency domain energy is greater than the first preset threshold, resetting the count corresponding to each candidate main microphone that has been selected, and returning to perform steps of acquiring the first audio data for playback by the loudspeaker, and acquiring the second audio data acquired by each microphone and the noise frequency domain energy corresponding to each microphone.

In some embodiments, the number of the microphone is denoted as N, after acquiring the second audio data acquired by each microphone, the method further includes: performing voice activity detection on N second audio data, determining X second audio data to be voice frames, and determining Y second audio data to be noise frames, X plus Y being equal to N, both X and Y being integers greater than or equal to 0, and N being an integer greater than 0; when both X and Y are not equal to 0, detecting whether the N second audio data contain a fundamental frequency of voice and a harmonic; and when any one of the N second audio data contains the fundamental frequency of voice and the harmonic, identifying the second audio data acquired by each microphone as voice data.

In some embodiments, a uniform ring microphone array is defined by N microphones, and each microphone is a directional microphone with an angle of 360°/N.

In some embodiments, after performing the voice activity detection on the N second audio data, determining X second audio data to be voice frames, and determining Y second audio data to be noise frames, the method further includes: when Y is equal to 0, identifying the second audio data acquired by each microphone as voice data.

In some embodiments, after performing voice activity detection on the N second audio data, determining X second audio data to be voice frames, and determining Y second audio data to be noise frames, the method further includes: when X is equal to 0, identifying the second audio data acquired by each microphone as noise data.

In some embodiments, after identifying the second audio data acquired by each microphone as voice data, the method further includes: selecting the second audio data with a maximum signal-to-noise ratio from the N second audio data to perform voice recognition.

In a second aspect, according to various embodiments of the present disclosure, a voice detection method for a microphone is provided. The voice detection method for the microphone includes: acquiring a local audio signal by N microphone at corresponding angles to obtain corresponding N second audio data, wherein each second audio data comprises an audio frame; performing voice activity detection on the N second audio data, determining X second audio data to be voice frames, and determining Y second audio data to be noise frames, wherein X plus Y is equal to N, both X and Y are integers greater than or equal to 0, and N is an integer greater than 0; when both X and Y are not equal to 0, detecting whether the N second audio data contain a fundamental frequency of voice and a harmonic; and when any one of the N second audio data contains the fundamental frequency of voice and the harmonic, identifying the local audio signal as a voice signal.

In some embodiments, a uniform ring microphone array is defined by the N microphones, and each microphone is a directional microphone with an angle of 360°/N.

In some embodiments, after performing voice activity detection on the N second audio data, determining X second audio data to be voice frames, and determining Y second audio data to be noise frames, the voice detection method for the microphone further includes: when Y is equal to 0, identifying the local audio signal as the voice signal.

In some embodiments, after performing voice activity detection on the N second audio data, determining X second audio data to be voice frames, and determining Y second audio data to be noise frames, the voice detection method for the microphone further includes: when X is equal to 0, identifying the local audio signal as a noise signal.

In some embodiments, after identifying the local audio signal as the voice signal, the voice detection method for the microphone further includes: selecting the second audio data with a maximum signal-to-noise ratio from the N second audio data to perform voice recognition.

In a third aspect, according to various embodiments of the present disclosure, an apparatus for switching a main microphone of a plurality of microphones is provided. The apparatus for switching the main microphone of the plurality of microphones includes an acquiring unit, a preprocessing unit, a first calculating unit, a second calculating unit, and a switching unit. The acquiring unit is configured for acquiring first audio data for playback by a loudspeaker, and acquiring second audio data acquired by each microphone and noise frequency domain energy corresponding to each microphone. The preprocessing unit is configured for preprocessing the first audio data and the second audio data, obtaining corresponding first frequency domain data and second frequency domain data. The first calculating unit is configured for calculating first frequency domain energy of the first frequency domain data and second frequency domain energy of the second frequency domain data. The second calculating unit is configured for selecting a candidate main microphone from the plurality of microphones according to the noise frequency domain energy and the second frequency domain energy corresponding to each microphone when the first frequency domain energy is less than a first preset threshold. The switching unit is configured for switching the candidate main microphone as the main microphone when the candidate main microphone is different from the current main microphone.

In a fourth aspect, according to various embodiments of the present disclosure, an apparatus for switching a main microphone of a plurality of microphones is provided. The apparatus for switching the main microphone of the plurality of microphones includes an acquiring module, a first detecting module, a second detecting module, and a processing module. The acquiring module is configured for acquiring a local audio signal by N microphone at corresponding angles to obtain corresponding N second audio data, wherein each second audio data comprises an audio frame. The first detecting module is configured for performing voice activity detection on the N second audio data, determining X second audio data to be voice frames, and determining Y second audio data to be noise frames, wherein X plus Y is equal to N, both X and Y are integers greater than or equal to 0, and N is an integer greater than 0. The second detecting module is configured for detecting whether the N second audio data contain a fundamental frequency of voice and a harmonic when both X and Y are not equal to 0. The processing module is configured for identifying the local audio signal as a voice signal when any one of the N second audio data contains the fundamental frequency of voice and the harmonic.

In a fifth aspect, according to various embodiments of the present disclosure, a microphone-loudspeaker integrated device is provided. The microphone-loudspeaker integrated device includes at least one processor and a memory communicatively connected to the at least one processor. The memory stores instructions executable by the at least one processor, and the instructions are executed by the at least one processor to implement the steps of the method for switching the main microphone of the plurality of microphones in the first aspect or any embodiment of the first aspect, or the voice detection method for the microphone in the second aspect or any embodiment of the second aspect.

In a sixth aspect, according to various embodiments of the present disclosure, a readable storage medium is provided. The readable storage medium has stored computer instructions, the computer instructions are executed by a computer to implement the steps of the method for switching the main microphone of the plurality of microphones in the first aspect or any embodiment of the first aspect, or the voice detection method for the microphone in the second aspect or any embodiment of the second aspect.

The above description is only an overview of technical solutions of the present disclosure, which may be implemented in accordance with contents of the specification in order to have a clearer understanding of technical means of the present disclosure, and in order to make the above and other purposes, features, and advantages of the present disclosure more apparent and easier to understand, specific embodiments of the present disclosure are hereinafter cited.

DETAILED DESCRIPTION OF THE EMBODIMENT

In order to make objects, features and advantages of the present disclosure more clearly understood, the specific embodiments of the present disclosure are described in detail below with reference to the accompanying drawings. Obviously, the described embodiments are a part of the embodiments of the present disclosure, and not all the embodiments. Based on the embodiments in the present disclosure, all other embodiments obtained by a person skilled in the art without creative labor fall within the scope of protection of the present disclosure.

Figure 1:
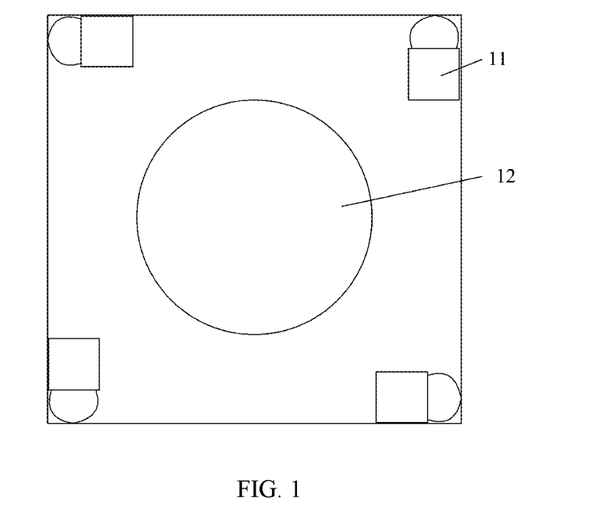
FIG. 1 is a schematic diagram of a microphone-loudspeaker integrated device in an embodiment of the present disclosure.
Figure 2:
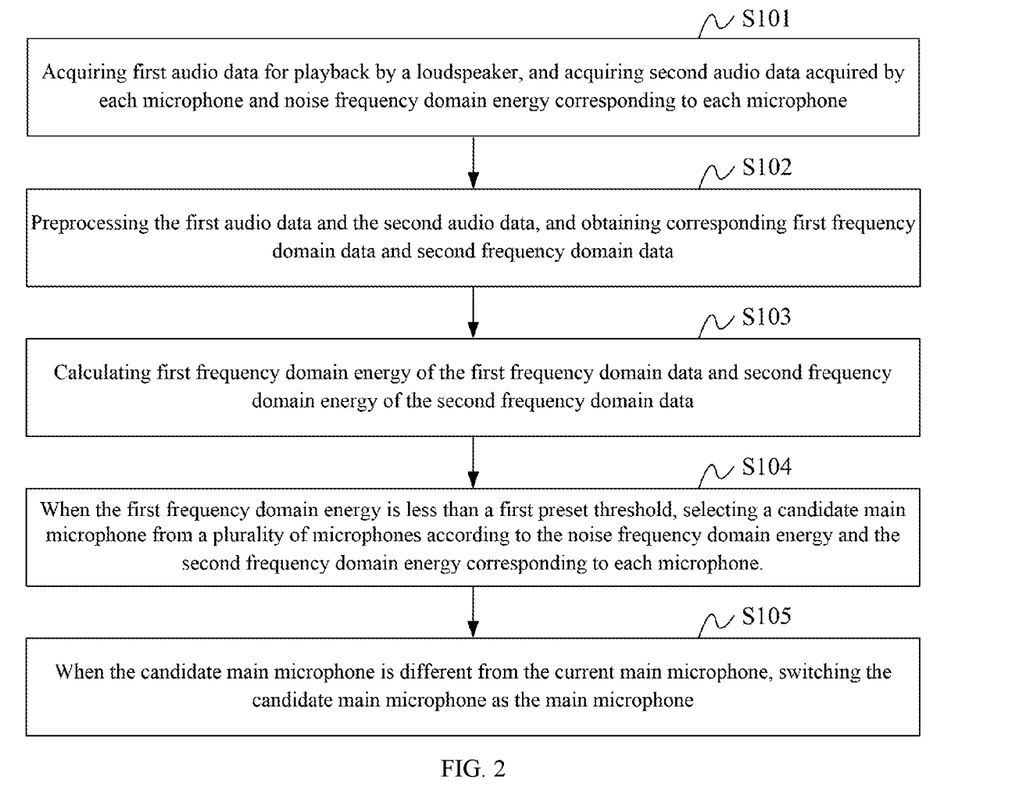
FIG. 2 is a flowchart of a method for switching a main microphone of a plurality of microphones in an embodiment of the present disclosure.

A method for switching a main microphone of a plurality of microphones is provided in embodiments of the present disclosure, which is applied in a microphone-loudspeaker integrated device shown in FIG. 1. The microphone-loudspeaker integrated device may include a plurality of microphones 11 and a loudspeaker 12. Four microphones are illustrated exemplarily in FIG. 1, but it is not limited as such, and the number of microphones of the microphone-loudspeaker integrated device is not limited in the embodiment of the present disclosure. Referring to FIG. 2, the method for switching the main microphone of the plurality of microphones may include step 101 to step 105.

Step 101 may include acquiring first audio data for playback by a loudspeaker, and acquiring second audio data acquired by each microphone and noise frequency domain energy corresponding to each microphone.

Specifically, the loudspeaker 12 is configured to play audio data sent from a remote end. The microphones 11 are configured to acquire local audio data. The audio data acquired by the microphones 11 may include a local speaking sound and/or a playback sound (echo) when the loudspeaker plays the audio data. The microphones 11 may be a directional microphone. In the embodiment of the present disclosure, for the microphone-loudspeaker integrated device shown in FIG. 1, four directional microphones with a directional angle of 90° to 100° may be used to be responsible for picking up audio in four directions. A square formation is defined by the four directional microphones spaced apart with 90°, and the four directional microphones cover 360° and may pick up omnidirectional audio. The directional microphones have an 8-pattern directivity. With an 8-pattern structure, a sound in a direction of the loudspeaker 12 (180° to 270° direction) may be suppressed, and a suppressed decibel will be greater than 10 db, so that a signal-to-echo ratio of the microphones (a ratio of a decibel of the local speaking sound picked up by the microphones 11 to a decibel of a voice being played in the loudspeaker 12 picked up by the microphone 11) may be improved. The first audio data for playback by the loudspeaker 12 may be acquired when the loudspeaker 12 is playing the first audio data or before the loudspeaker 12 plays the first audio data. The second audio data acquired by each microphone 11 may be acquired when each microphone 11 is acquiring the second audio data or after each microphone 11 has acquired the second audio data. The noise frequency domain energy corresponding to each microphone is configured to characterize a magnitude of the noise corresponding to each microphone. The noise frequency domain energy corresponding to each microphone may be acquired by analyzing and calculating the audio data which has been acquired by each microphone for a recent period of time prior to the current moment.

Step 102 may include preprocessing the first audio data and the second audio data, and obtaining corresponding first frequency domain data and second frequency domain data. Specifically, the preprocessing the first audio data and the second audio data may include windowing the first audio data and the second audio data first, then performing a fast Fourier transform and an adaptive filtering to convert into corresponding first frequency domain data and second frequency domain data.

Step 103 may include calculating first frequency domain energy of the first frequency domain data and second frequency domain energy of the second frequency domain data. Specifically, a square of an amplitude corresponding to each frequency in the first frequency domain data may be accumulated to obtain the first frequency domain energy of the first frequency domain data. For each second frequency domain data, a square of an amplitude corresponding to each frequency in the second frequency domain data may be accumulated to obtain the second frequency domain energy of the second frequency domain data. The first frequency domain energy is configured to distinguish whether the loudspeaker 12 is in a state of playing audio data or a mute state. The second frequency domain energy is configured to distinguish whether the microphones 11 are in a state of acquiring audio data or a mute state.

Step 104 may include when the first frequency domain energy is less than a first preset threshold, selecting a candidate main microphone from the plurality of microphones according to the noise frequency domain energy and the second frequency domain energy corresponding to each microphone. Specifically, the first preset threshold may be obtained empirically. When the first frequency domain energy is less than the first preset threshold, it may indicate that the loudspeaker 12 is in the mute state. When the loudspeaker 12 is in the mute state, it may be determined whether the microphones 11 are in the state of acquiring audio data or the mute state by the second frequency domain energy corresponding to respective microphones 11, the magnitude of the noise corresponding to the microphones 11 may be determined by the noise frequency domain energy corresponding to respective microphones 11, and a signal-to-noise ratio corresponding to the microphones 11 may be determined by a ratio of the second frequency domain energy to the noise frequency domain energy corresponding to respective microphones 11. Thereby, the candidate main microphone may be selected from the microphones 11 according to the state of the microphones 11, the magnitude of the noise corresponding to the microphones 11, and the signal-to-noise ratio corresponding to the microphones 11.

In the present disclosure, the candidate main microphone may be selected when the first frequency domain energy is less than the first preset threshold, which may ensure that this candidate main microphone is selected when the loudspeaker 12 is in the mute state, avoid selecting a microphone that is able to receive the strongest echo (i.e., a microphone with the strongest echo signal) as the candidate main microphone, and thereby avoid selecting the microphone with the strongest echo signal as the main microphone.

Step 105 may include when the candidate main microphone is different from the current main microphone, switching the candidate main microphone as the main microphone.

In the method for switching the main microphone of the plurality of microphones provided in the present disclosure, since a playback sound when the loudspeaker plays the audio data may be acquired by each microphone, the first frequency domain energy corresponding to the loudspeaker may be calculated, when the first frequency domain energy is less than the first preset threshold, i.e., a state in which the loudspeaker does not play the audio data, the candidate main microphone may be selected. In this way, it is possible to avoid that the selected candidate main microphone is the microphone with the strongest echo signal, and thereby avoid that the main microphone after switching is the microphone with the strongest echo signal. The noise frequency domain corresponding to each microphone may be acquired, the second frequency domain energy corresponding to each microphone may be calculated, and the candidate main microphone may be selected from the plurality of microphones according to the noise frequency domain energy and the second frequency domain energy corresponding to each microphone. In this way, it may be achieved that the candidate main microphone may be selected from the plurality of microphones which are in different states, so that the selected candidate main microphone has highest sound quality, and it is possible to avoid that the selected candidate main microphone is a noisiest microphone, and thereby avoid that the main microphone after switching is the noisiest microphone.

In some embodiments, in order to improve switching sensitivity of the main microphone, when acquiring the first audio data for playback by the loudspeaker, a frame number of acquired audio data may be 1, and when acquiring the second audio data acquired by each microphone, a frame number of acquired audio data may be 1. In other words, the first audio data/the second audio data may have 1 frame. Alternatively, a duration of one frame may be 10 ms.

In some embodiments, in the step 101, acquiring the noise frequency domain energy corresponding to each microphone may include: for each microphone, when a frame number of audio data that have been acquired by the microphone is greater than or equal to a preset number, determining the newest frames of the audio data that have been acquired with the preset number, preprocessing each frame of the newest frames of the audio data to obtain corresponding third frequency domain data, calculating third frequency domain energy of the third frequency domain data, and taking a minimum third frequency domain energy as the noise frequency domain energy corresponding to the microphone.

Specifically, since the first audio data/the second audio data may have 1 frame when acquiring the first audio data for playback by the loudspeaker and acquiring the second audio data acquired by each microphone, the second frequency domain energy of the second frequency domain data may be energy corresponding to 1 frame of audio data. Therefore, the noise frequency domain energy corresponding to each microphone may also be energy corresponding to 1 frame of audio data. For each microphone 11, when the frame number of the audio data that have been acquired by the microphone is greater than or equal to the preset number, the minimum third frequency domain energy may be selected as the noise frequency domain energy corresponding to the microphone from the third frequency domain energy corresponding to the newest frames of the audio data that have been acquired with the preset number.

In the present embodiments, since each microphone may be unstable in an early stage, the frame number of the audio data that have been acquired by the microphone may be counted, when the frame number of the audio data that have been acquired by the microphone is greater than or equal to the preset number, the noise frequency domain energy corresponding to the microphone may be acquired, resulting in that the main microphone may be switched after the frame number of the audio data that have been acquired by each microphone is greater than or equal to the preset number, i.e., after each microphone is in a stable state, ensuring accuracy of the switching of the main microphone. Moreover, the minimum third frequency domain energy may be selected as the noise frequency domain energy corresponding to the microphone from the third frequency domain energy corresponding to the newest frames of the audio data that have been acquired with the preset number, thus the noise frequency domain energy may be obtained more accurately.

In some embodiments, in the step 104, when the first frequency domain energy is less than the first preset threshold, selecting the candidate main microphone from the plurality of microphones according to the noise frequency domain energy and the second frequency domain energy corresponding to each microphone may include: when the first frequency domain energy is less than the first preset threshold, and at least one of the second frequency domain energy is greater than a second preset threshold, calculating a signal-to-noise ratio corresponding to each microphone based on the noise frequency domain energy and the second frequency domain energy corresponding to each microphone, and selecting a microphone with a maximum signal-to-noise ratio as the candidate main microphone; or, when the first frequency domain energy is less than the first preset threshold, and each of the second frequency domain energy is less than the second preset threshold, selecting a microphone with minimum noise frequency domain energy as the candidate main microphone.

Specifically, when the first frequency domain energy is less than the first preset threshold, it may indicate that the loudspeaker 12 is in the mute state. When at least one of the second frequency domain energy is greater than the second preset threshold, it may indicate that at least one microphone 11 has acquired the local speaking sound and the local speaking voice is present. The signal-to-noise ratio corresponding to each microphone may be determined, and the microphone with the maximum signal-to-noise ratio may be selected as the candidate main microphone. A calculating formula of the signal-to-noise ratio may be: SNR=Ps/Pn, SNR represents the signal-to-noise ratio, Ps represents the second frequency domain energy, and Pn represents the noise frequency domain energy.

When each of the second frequency domain energy is less than the second preset threshold, it may indicate that no microphone 11 has acquired the local speaking sound and the local speaking voice is not present. A comparison among a magnitude of the noise of the microphones 11 may be performed, i.e., a comparison among a magnitude of the noise frequency domain energy of the microphones 11. The microphone 11 with the minimum noise frequency domain energy may be selected as the candidate main microphone.

In the present embodiments, when the first frequency domain energy is less than the first preset threshold, and at least one of the second frequency domain energy is greater than the second preset threshold, the signal-to-noise ratio corresponding to each microphone may be calculated based on the noise frequency domain energy and the second frequency domain energy corresponding to each microphone. The microphone with the maximum signal-to-noise ratio may be selected as the candidate main microphone, and the selected candidate main microphone may have a highest sound quality. When the first frequency domain energy is less than the first preset threshold, and each of the second frequency domain energy is less than the second preset threshold, the microphone with the minimum noise frequency domain energy may be selected as the candidate main microphone. The selected candidate main microphone may have a least amount of the noise, avoiding selecting the noisiest microphone.

In some embodiments, in the step 105, when the candidate main microphone is different from the current main microphone, and before switching the candidate main microphone as the main microphone, the method for switching the main microphone of the plurality of microphones may further include: updating a count corresponding to the candidate main microphone to the current count plus one; when the updated count reaches a threshold, switching the candidate main microphone to the main microphone; when the updated count is less than the threshold, returning to perform steps of acquiring the first audio data for playback by the loudspeaker, and acquiring the second audio data acquired by each microphone and the noise frequency domain energy corresponding to each microphone.

Specifically, the switching of the main microphone may be performed by counting the candidate main microphone. That is, after the candidate main microphone is selected each time and it is determined that the current main microphone is different from the candidate main microphone, the count corresponding to the selected candidate main microphone each time may be updated to the current count plus one, and when the updated count of the currently selected candidate main microphone reaches the threshold, the currently selected candidate main microphone may be switched to be the main microphone. When the updated count of the currently selected candidate primary microphone is less than the threshold value, it may return to perform the steps of acquiring the first audio data for playback by the loudspeaker, and acquiring the second audio data acquired by each microphone and the noise frequency domain energy corresponding to each microphone. A candidate primary microphone may be selected from the microphones continuously.

In the present embodiments, when the candidate main microphone is different from the current main microphone, and before switching the candidate main microphone as the main microphone, the switching of the main microphone may be performed by counting the candidate main microphone. It is possible to realize jitter processing when switching the main microphone of the plurality of microphones to avoid frequent switching of the main microphone.

In some embodiments, after the step 105, the method for switching the main microphone of the plurality of microphones may further include: resetting the count corresponding to each candidate main microphone other than the main microphone, and returning to perform steps of acquiring the first audio data for playback by the loudspeaker, and acquiring the second audio data acquired by each microphone and the noise frequency domain energy corresponding to each microphone.

Specifically, after selecting the main microphone in candidate main microphones, the count corresponding to each candidate main microphone other than the main microphone may still exist, in order to avoid frequent switching of the main microphone, the count corresponding to each candidate main microphone other than the main microphone should be reset, so that so that the count corresponding to each candidate main microphone other than the main microphone is zeroed. prevent the switching of the main microphone may be performed by counting the candidate main microphone. That is, after the candidate main microphone is selected each time and it is determined that the current main microphone is different from the candidate main microphone, the count corresponding to the selected candidate main microphone each time may be updated to the current count plus one, and when the updated count of the currently selected candidate main microphone reaches the threshold, the currently selected candidate main microphone may be switched to be the main microphone. When the updated count of the currently selected candidate primary microphone is less than the threshold value, it returns to perform the steps of acquiring the first audio data for playback by the loudspeaker, and acquiring the second audio data acquired by each microphone and the noise frequency domain energy corresponding to each microphone, continuing to select a candidate primary microphone from the microphones. It may return to perform the steps of acquiring the first audio data for playback by the loudspeaker, and acquiring the second audio data acquired by each microphone and the noise frequency domain energy corresponding to each microphone. A candidate primary microphone may be selected from the microphones continuously to achieve a next switching of the main microphone.

In some embodiments, the method for switching the main microphone of the plurality of microphones may further include: when the first frequency domain energy is greater than the first preset threshold, resetting the count corresponding to each candidate main microphone that has been selected, and returning to perform steps of acquiring the first audio data for playback by the loudspeaker, and acquiring the second audio data acquired by each microphone and the noise frequency domain energy corresponding to each microphone.

Specifically, when the first frequency domain energy is greater than the first preset threshold, it may indicate that the loudspeaker 12 is playing the audio data and in a playing state. In order to avoid the selected candidate main microphone is a microphone 11 that receives the strongest echo, i.e., the microphone 11 with the strongest echo signal, no candidate main microphone may be selected, and the count corresponding to each selected candidate main microphone may be reset at this moment. It may return to perform the steps of acquiring the first audio data for playback by the loudspeaker, and acquiring the second audio data acquired by each microphone and the noise frequency domain energy corresponding to each microphone. A candidate primary microphone may be selected from the microphones continuously to achieve a next switching of the main microphone.

Voice detection may also be involved in the switching of the microphone. Voice activity detection (VAD) algorithm may be commonly configured to determine whether given audio data is voice or noise, and a corresponding result may be commonly used in algorithms of voice coding and decoding, voice enhancement, gain control, and voice wake-up recognition. A voice activity detection method based on deep learning may operate well in high SNR environments, but in low SNR environments, clear tones (sounds made by a vocal cord that does not vibrate during vocalization and with low energy) may be misjudged as noise due to the presence of non-stationary noise.

Figure 3:
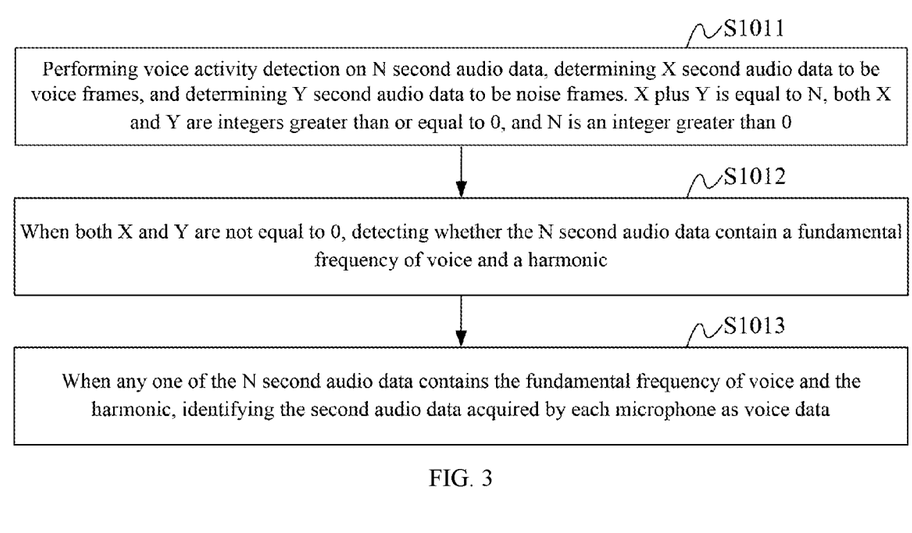
FIG. 3 is a flowchart of a voice detection method in an embodiment of the present disclosure.

In some embodiments, a voice detection method may be provided to improve stability of voice recognition in voice detection and reduce misjudgment of voice and noise. Referring to FIG. 3, the number of the microphones may be N. After acquiring the second audio data acquired by each microphone, the method further includes step 1011 to step 1013.

Step 1011 may include performing voice activity detection on N second audio data, determining X second audio data to be voice frames, and determining Y second audio data to be noise frames. X plus Y may be equal to N, both X and Y may be integers greater than or equal to and N may be an integer greater than 0.

The voice activity detection may be performed on the N second audio data. The voice activity detection may distinguish a voice region and a non-voice region, and may be configured to accurately locate a start point and an end point of voice from voice with noise generally, to remove muted portions, to remove noisy portions, and to find what is really valid about a piece of voice. In the present embodiments, the voice activity detection may be performed on the N second audio data by any of relevant mature voice activity detection methods, to determine whether the N second audio data are voice frames or noise frames. In an embodiment, a detection result is that the N second audio data include X voice frames and Y noise frames. When N microphones acquires audio data, a portion of directional non-stationary noise may be acquired by some microphones in some directions, so that the N second audio data may include both the voice frames and the noise frames. A result of determining whether a single second audio data is a voice frame or a noise frame by the voice activity detection may be not very accurate, so the voice activity detection may be performed on a plurality of second audio data in the present embodiment. When at least one of the second audio data is a voice frame, the plurality of second audio data may be processed next.

It should be noted that a specifical processing of acquiring the second audio data acquired by each microphone may include: acquiring a local audio signal by N directional microphones at corresponding angles to obtain corresponding N second audio data. Each second audio data may include an audio frame, the non-stationary noise in the audio data may decay faster because of lower energy thereof and generally cannot be reflected indoors, and the voice may have higher energy and be acquired by the microphones via reflection. Therefore, the voice may be acquired by all the microphones, but the portion of directional non-stationary noise may be acquired by some microphones in some directions, so it needs to carry out a next processing to remove an effect of this portion of directional non-stationary noise on the voice. At least 3 or more directional microphones may be needed, and the more the microphones are, the better a final result will be.

Step 1012 may include when both X and Y are not equal to 0, detecting whether the N second audio data contain a fundamental frequency of voice and a harmonic.

When both X and Y are not equal to 0, that is, the N second audio data may include both the voice frames and the noise frames, a fundamental frequency of voice and harmonic detection may be performed on the N second audio data. The voice may include a tone, the tone may be an important acoustic parameter and include a tonal value and a tonal pattern, the tonal value may be determined by a value of a fundamental frequency, and the tonal pattern may be determined by a trend of the tonal value, so that the fundamental frequency may be an important parameter of the voice data. In the present embodiment, the fundamental frequency of voice and harmonic detection may detect whether or not the second audio data contains the acoustic parameter such as the tone, and further determine whether or not the audio data acquired by the microphones is voice data, in order to remove the effect of the portion of the directional non-stationary noise on a final result when the microphones acquire the audio data.

Step 1013 may include when any one of the N second audio data contains the fundamental frequency of voice and the harmonic, identifying the second audio data acquired by each microphone as voice data.

When any one of the N second audio data contains the fundamental frequency of voice and the harmonic, i.e., the acoustic parameter such as the tone, it means that the second audio data is voice data, i.e., the second audio data acquired by the microphones may contain voice data, and the second audio data acquired by the microphones may be identified as voice data.

In this way, even if the audio data contains a portion of noise data and voice energy in the audio data is weak, it is possible to avoid recognizing the voice as noise.

In some embodiments, a uniform ring microphone array may be defined by N microphones, and each microphone may be a directional microphone with an angle of 360°/N.

N directional microphones may be placed horizontally at a uniform angle of 360°/N to form the ring microphone array, a sound source may be located at an arbitrary position at a periphery of the microphone array, and an audio signal emitted by the sound source may be acquired. The directional microphone in each direction may receive signals from the direction at the angle of 360°/N, so that second audio signals acquired by a plurality of directional microphones may be different in directions, and the second audio data acquired may also be different. It may circumvent most of the non-stationary noise, and some of received directional non-stationary noise may further be processed to remove the effect of the portion of the directional non-stationary noise on the final result.

In some embodiments, after performing the voice activity detection on the N second audio data, determining X second audio data to be voice frames, and determining Y second audio data to be noise frames, the method may further include: when Y is equal to 0, identifying the second audio data acquired by each microphone as voice data.

When Y is equal to 0, the N second audio data may be all voice frames, and the second audio data acquired by the microphones may be voice data unquestionably.

In some embodiments, after performing voice activity detection on the N second audio data, determining X second audio data to be voice frames, and determining Y second audio data to be noise frames, the method may further include: when X is equal to 0, identifying the second audio data acquired by each microphone as noise data.

When X is equal to 0, the N second audio data may be all noise frames, and the second audio data acquired by the microphones may be noise data unquestionably.

In some embodiments, after identifying the second audio data acquired by each microphone as voice data, the method may further include: selecting the second audio data with a maximum signal-to-noise ratio from the N second audio data to perform voice recognition.

The second audio data with the maximum signal-to-noise ratio may be selected from the N second audio data. The signal-to-noise ratio may refer to a ratio of a signal to a noise, the higher the ratio is, the less a noise portion of the data is, and the higher the quality of the data. The second audio data with highest quality may be selected from the N second audio data to perform voice recognition.

In the above embodiments, since the non-stationary noise has lower energy, decays faster, and generally cannot be reflected indoors, and the voice has higher energy and may be acquired by the microphones via reflection, the voice may be acquired by all the microphones, but some directional non-stationary noise may be acquired by some directional microphones, the present embodiment may utilize the microphone array to acquire the local audio signal, and the plurality of second audio data may be obtained. The voice activity detection may be performed on the plurality of second audio data to determine whether the plurality of second audio data are voice frames or noise frames. When the plurality of second audio data are all voice frames, it is determined that the local audio signal is a voice signal. When the plurality of second audio data are all noise frames, it is determined that the local audio signal is a noise signal. When the plurality of second audio data include voice frames and noise frames at the same time, it is possible that the portion of directional non-stationary noise is acquired by some microphones in some directions, so it is necessary to further detect whether the plurality of second audio data contain the fundamental frequency of voice and harmonic. When any one of the second audio data contains the fundamental frequency of voice and harmonic, it is determined that the local audio signal is a voice signal. Three scenarios for different results may be summarized in the present embodiment and voice judgments may be performed, respectively, which may filter out the non-stationary noise that a conventional algorithm cannot judge, and may stably identify a variety of realistic noises.

Figure 4:
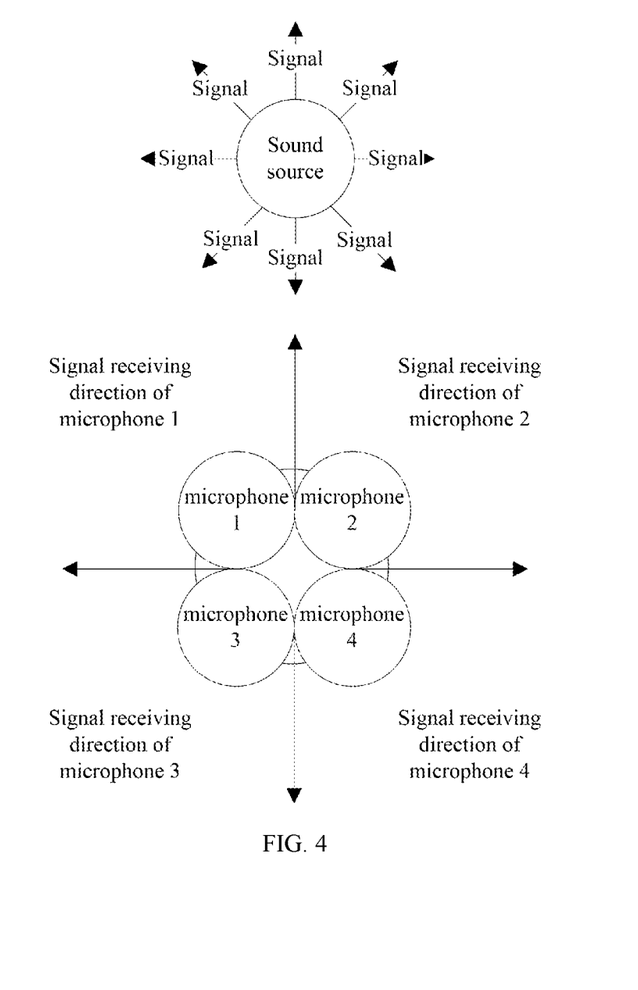
FIG. 4 is a schematic diagram of a microphone array device in an embodiment of the present disclosure.
Figure 5:
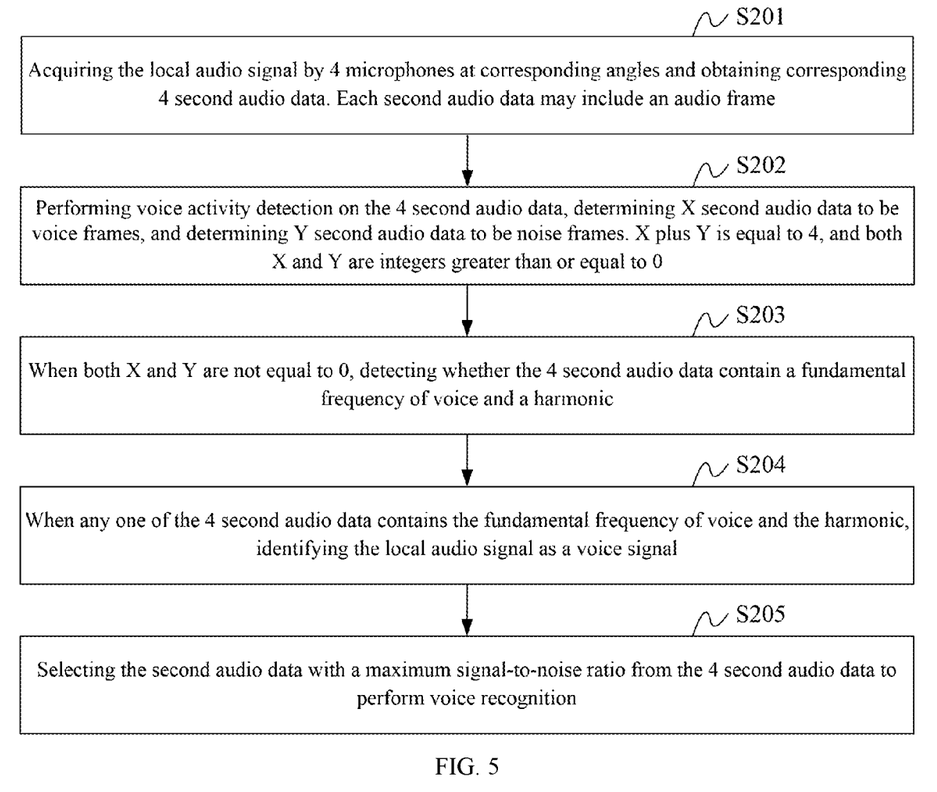
FIG. 5 is a flowchart of a voice detection method in another embodiment of the present disclosure.

Specifically, referring to FIG. 4, 4 directional microphones may be placed horizontally at a uniform angle of 90° to form the ring microphone array, the sound source may be located at the arbitrary position at the periphery of the microphone array, and the local audio signal may be acquired. The directional microphone in each direction may receive signals from the direction at the angle of 90°. Referring to FIG. 5, a voice detecting process may include step 201 to step 205.

Step 201 may include acquiring the local audio signal by 4 microphones at corresponding angles and obtaining corresponding 4 second audio data. Each second audio data may include an audio frame.

Referring to FIG. 4, microphone 1 and microphone 2 may acquire the local audio signal emitted by the sound source that contains the non-stationary noise. A direction of signal reception of the microphone 1 and the microphone 2 is relative to an emitting direction of the signal emitted by the sound source, so the second audio data acquired by the microphone 1 and the microphone 2 may contain the non-stationary noise emitted by the sound source in a straight line. The direction of signal reception of microphone 3 and microphone 4 is not relative to the emitting direction of the signal emitted by the sound source, so the local audio signal received by the microphone 3 and the microphone 4 may be reflected many times, and the non-stationary noise in the local audio signal may be not received by the microphone 3 and the microphone 4 due to low energy. The second audio data acquired by the microphone 3 and the microphone 4 may not contain the non-stationary noise.

Step 202 may include performing voice activity detection on the 4 second audio data, determining X second audio data to be voice frames, and determining Y second audio data to be noise frames. X plus Y is equal to 4, and both X and Y are integers greater than or equal to 0.

Referring to FIG. 4, the voice activity detection may be performed on the second audio data acquired by the 4 microphones, the second audio data acquired by the microphone 1 and the microphone 2 may contain the non-stationary noise and may be determined to be noise frames after detection. The second audio data acquired by the microphone 1 and the microphone 2 may contain the non-stationary noise and may be determined to be noise frames after detection. The second audio data acquired by the microphone 1 and the microphone 2 may not contain the non-stationary noise and is determined to be voice frames after detection.

Step 203 may include that when both X and Y are not equal to 0, detecting whether the 4 second audio data contain a fundamental frequency of voice and a harmonic.

Referring to FIG. 4, the second audio data acquired by the microphone 1 and the microphone 2 may be determined to be noise frames after detection as containing the non-stationary noise. The second audio data acquired by the microphone 1 and the microphone 2 may be determined to be voice frames after detection as not containing the non-stationary noise. Therefore, the voice fundamental frequency and harmonic detection needs to be performed on signals received by the 4 microphones.

Step 204 may include when any one of the 4 second audio data contains the fundamental frequency of voice and the harmonic, identifying the local audio signal as a voice signal.

When any one of the 4 second audio data contains the fundamental frequency of voice and the harmonic, i.e., the acoustic parameter such as the tone, it means that the second audio data is voice data, i.e., the local audio signal may be identified as the voice signal.

Step 205 may include that selecting the second audio data with a maximum signal-to-noise ratio from the 4 second audio data to perform voice recognition.

The second audio data with the maximum signal-to-noise ratio may be selected from the 4 second audio data. The signal-to-noise ratio may refer to a ratio of a signal to a noise in the data, the higher the ratio is, the less a noise portion of the data is, and the higher the quality of the data. The second audio data with highest quality may be selected from the 4 second audio data to perform voice recognition.

In some embodiments, a uniform ring microphone array may be defined by the 4 microphones, and each microphone may be a directional microphone with an angle of 90°.

In some embodiments, after performing the voice activity detection on the 4 second audio data, determining X second audio data to be voice frames, and determining Y second audio data to be noise frames, the method may further include: when Y is equal to 0, identifying the local audio signal as the voice signal.

When Y is equal to 0, the 4 second audio data may be all voice frames, and the local audio signal may be the voice signal unquestionably. Referring to FIG. 4, the second audio data acquired by the 4 microphones may be determined to be voice frames after detection, and the local audio signal emitted by the sound source may be the voice signal.

In some embodiments, after performing voice activity detection on the 4 second audio data, determining X second audio data to be voice frames, and determining Y second audio data to be noise frames, the method may further include: when X is equal to 0, identifying the local audio signal as the noise signal.

When X is equal to 0, the 4 second audio data may be all noise frames, and the local audio signal may be the noise signal unquestionably. Referring to FIG. 4, the second audio data acquired by the 4 microphones may be determined to be noise frames after detection, and the local audio signal emitted by the sound source may be the noise signal.

It should be noted that a voice detection process of the microphones and a switching process of the main microphone may be operated simultaneously or separately.

In addition, the voice detection may be operated alone. The present disclosure also provides a voice detection method of a microphone, including: acquiring a local audio signal by N microphone at corresponding angles to obtain corresponding N second audio data, each second audio data including an audio frame; performing voice activity detection on the N second audio data, determining X second audio data to be voice frames, and determining Y second audio data to be noise frames, X plus Y being equal to N, both X and Y being integers greater than or equal to 0, and N being an integer greater than 0; when both X and Y are not equal to 0, detecting whether the N second audio data contain a fundamental frequency of voice and a harmonic; and when any one of the N second audio data contains the fundamental frequency of voice and the harmonic, identifying the local audio signal as a voice signal.

In some embodiments, a uniform ring microphone array may be defined by N microphones, and each microphone may be a directional microphone with an angle of 360°/N.

In some embodiments, after performing the voice activity detection on the N second audio data, determining X second audio data to be voice frames, and determining Y second audio data to be noise frames, the method may further include: when Y is equal to 0, identifying the second audio data acquired by each microphone as voice data.

In some embodiments, after performing voice activity detection on the N second audio data, determining X second audio data to be voice frames, and determining Y second audio data to be noise frames, the method may further include: when X is equal to 0, identifying the second audio data acquired by each microphone as noise data.

In some embodiments, after identifying the second audio data acquired by each microphone as voice data, the method may further include: selecting the second audio data with a maximum signal-to-noise ratio from the N second audio data to perform voice recognition.

The specific process and technical effects of the voice detection method of the microphone have been described in the above embodiments, and will not be repeated herein.

Figure 6:
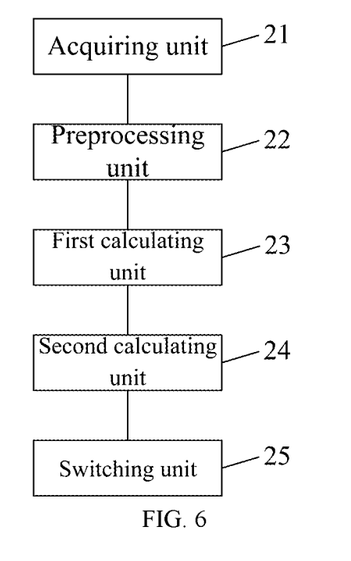
FIG. 6 is a schematic diagram of an apparatus for switching a main microphone of a plurality of microphones in an embodiment of the present disclosure.

The present disclosure further provides an apparatus for switching a main microphone of a plurality of microphones. Referring to FIG. 6, the apparatus for switching the main microphone of the plurality of microphones includes an acquiring unit 21, a preprocessing unit 22, a first calculating unit 23, a second calculating unit 24, and a switching unit 25.

The acquiring unit 21 is configured for acquiring first audio data for playback by a loudspeaker, and acquiring second audio data acquired by each microphone and noise frequency domain energy corresponding to each microphone. The specific embodiments are described in the Step 101 of the above method embodiments and will not be repeated herein.

The preprocessing unit 22 is configured for preprocessing the first audio data and the second audio data, obtaining corresponding first frequency domain data and second frequency domain data. The specific embodiments are described in the Step 102 of the above method embodiments and will not be repeated herein.

The first calculating unit 23 is configured for calculating first frequency domain energy of the first frequency domain data and second frequency domain energy of the second frequency domain data. The specific embodiments are described in the Step 103 of the above method embodiments and will not be repeated herein.

The second calculating unit 24 is configured for selecting a candidate main microphone from the plurality of microphones according to the noise frequency domain energy and the second frequency domain energy corresponding to each microphone when the first frequency domain energy is less than a first preset threshold. The specific embodiments are described in the Step 104 of the above method embodiments and will not be repeated herein.

The switching unit 25 is configured for switching the candidate main microphone as the main microphone when the candidate main microphone is different from the current main microphone. The specific embodiments are described in the Step 105 of the above method embodiments and will not be repeated herein.

In the apparatus for switching the main microphone of the plurality of microphones provided in the present disclosure, since a playback sound when the loudspeaker plays the audio data may be acquired by each microphone, the first frequency domain energy corresponding to the loudspeaker may be calculated, when the first frequency domain energy is less than the first preset threshold, i.e., a state in which the loudspeaker does not play the audio data, the candidate main microphone may be selected. In this way, it is possible to avoid that the selected candidate main microphone is the microphone with the strongest echo signal, and thereby avoid that the main microphone after switching is the microphone with the strongest echo signal. The noise frequency domain corresponding to each microphone may be acquired, the second frequency domain energy corresponding to each microphone may be calculated, and the candidate main microphone may be selected from the plurality of microphones according to the noise frequency domain energy and the second frequency domain energy corresponding to each microphone. In this way, it may be achieved that the candidate main microphone may be selected from the plurality of microphones which are in different states, so that the selected candidate main microphone has highest sound quality, and it is possible to avoid that the selected candidate main microphone is a noisiest microphone, and thereby avoid that the main microphone after switching is the noisiest microphone.

Figure 7:
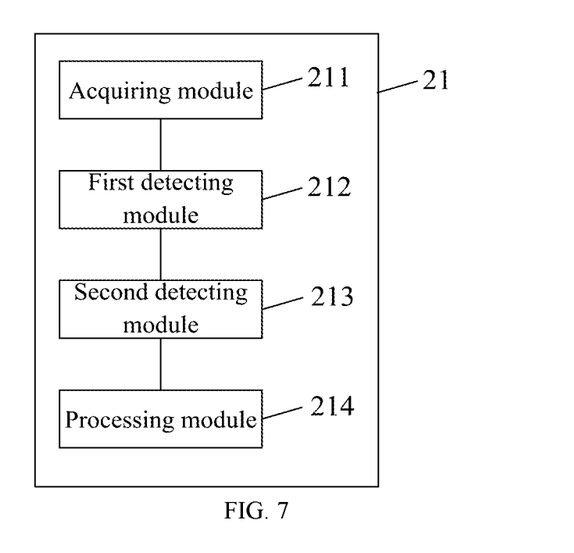
FIG. 7 is a schematic diagram of an acquiring unit in an embodiment of the present disclosure.

In some embodiments, referring to FIG. 7, the acquiring unit 21 may include an acquiring module 211, a first detection module 212, a second detection module 213, and a processing module 214.

The acquiring module 211 is configured for acquiring a local audio signal by N microphone at corresponding angles to obtain corresponding N second audio data. Each second audio data may include an audio frame.

The first detection module 212 is configured for performing voice activity detection on the N second audio data, determining X second audio data to be voice frames, and determining Y second audio data to be noise frames. X plus Y is equal to N, both X and Y are integers greater than or equal to 0, and N is an integer greater than 0.

The second detection module 213 is configured for detecting whether the N second audio data contain a fundamental frequency of voice and a harmonic when both X and Y are not equal to 0.

The processing module 214 is configured for identifying the local audio signal as a voice signal when any one of the N second audio data contains the fundamental frequency of voice and the harmonic.

In some embodiments, the acquiring module 211 may include N microphones, a uniform ring microphone array may be defined by the N microphones, and each microphone may be a directional microphone with an angle of 360°/N.

In some embodiments, the processing module 214 is further configured for identifying the local audio signal as the voice signal when Y is equal to 0.

In some embodiments, the processing module 214 is further configured for identifying the local audio signal as a noise signal when X is equal to 0.

In some embodiments, the processing module 214 is further configured for selecting the second audio data with a maximum signal-to-noise ratio from the N second audio data to perform voice recognition.

It should be noted that the acquiring module 211, the first detection module 212, the second detection module 213, and the processing module 214 may be exist alone and not attached to the acquiring unit 21.

Figure 8:
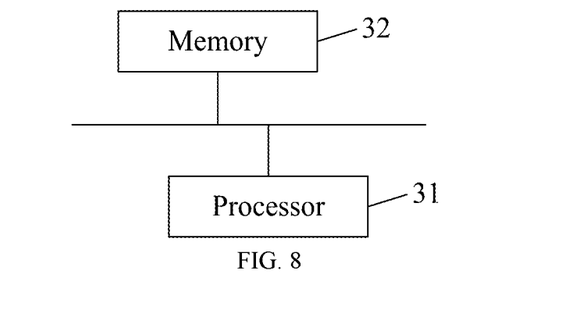
FIG. 8 is a schematic diagram of a hardware structure of a microphone-loudspeaker integrated device in an embodiment of the present disclosure.

Based on the same inventive idea as the method for switching the main microphone of the plurality of microphones in the preceding embodiments, the present disclosure further provides a microphone-loudspeaker integrated device. Referring to FIG. 8, the microphone-loudspeaker integrated device includes a processor 31 and a memory 32, the processor 31 and the memory 32 are connected by a bus or other means, and FIG. 8 takes a bus connection as an example.

The processor 31 may be a Central Processing Unit (CPU). The processor 31 may also be other general-purpose processors, a Digital Signal processor (DSP), an Application Specific Integrated Circuit (ASIC), a Field-Programmable Gate Array (FPGA), other programmable logic devices, discrete gates, transistor logic devices, discrete hardware components, or a combination of the above.

The memory 32, as a non-transient computer readable storage medium, is configured to store a non-transient software program, a non-transient computer executable program and module, such as program instructions/modules corresponding to the method for switching the main microphone of the plurality of microphones in the embodiments of the present disclosure. The processor 31 may execute various functional applications and data processing of the processor by running the non-transient software programs, instructions and modules stored in the memory 32, that is, the method for switching the main microphone of the plurality of microphones and the voice detection method of the microphone in the above embodiments may be realized.

The memory 32 may include a program storing region and a data storing region. The program storing region may store application programs required by an operating system and at least one function. The data storing region may store data created by the processor 31. In addition, the memory 32 may include a high-speed random-access memory and may further include a non-transient memory, such as at least one disk storage device, one flash memory device, or other non-transient solid-state storage device. In some embodiments, the memory 32 may include a memory that is remotely set up relative to the processor 31 alternatively, which may be connected to the processor 31 via a network. Examples of such network may include, but are not limited to, the Internet, corporate intranets, local area networks, mobile communication networks and the combinations of the above.

One or more of the above modules may be stored in the memory 32. When the modules are executed by the processor 31, the method for switching the main microphone of the plurality of microphones and the voice detection method of the microphone may be performed in the embodiment shown in FIG. 2.

The specific details of the above microphone-loudspeaker integrated device may be understood by referring to the corresponding descriptions and effects in the embodiments shown in FIG. 2 and FIG. 3, and will not be repeated herein.

One skilled in the art may understand that a realization of all or part of the process in the above embodiments may be accomplished by instructing a relevant hardware via a computer program, and the program may be stored in a computer readable storage medium. When the program is executed, processes in the embodiments of the above methods may be included. The storage medium may be a Disk, a compact disc, a Read-Only Memory (ROM), a Random Access Memory (RAM), a Flash Memory, a Hard disk Drive (HDD), a Solid-State Drive (SSD), etc. The storage medium may further include a combination of the above-mentioned kinds of memories.

One skilled in the art should understand that embodiments of the present disclosure may be provided as a method, a system, or a computer program product. Therefore, the present disclosure may take a form of a full hardware embodiment, a full software embodiment, or a combination of software and hardware embodiments. Furthermore, the present disclosure may take the form of a computer program product implemented on one or more computer available storage media (including but not limited to a disk memory, a CD-ROM, an optical memory, etc.) in which computer available program code is contained.

The present disclosure may be described by reference to flowcharts and/or block diagrams of a method, a device (a system), and a computer program product based on embodiments of the present disclosure. It should be understood that each process and/or block in a flowchart and/or a block diagram, and a combination of processes and/or blocks in a flowchart and/or a block diagram, may be implemented by computer program instructions. These computer program instructions may be supplied to a general-purpose computer, a special purpose computer, an embedded processor, or a processor of other programmable information processing device to produce a machine, enabling instructions executed by the processor of a computer or other programmable information processing device to produce a device configured to implement a function specified in a flow or flows in a flowchart and/or a block or blocks in a block diagram.

These computer program instructions may also be stored in computer-readable memory capable of directing a computer or other programmable information processing device to operate in a particular manner such that the instructions stored in such computer-readable memory may produce manufactured goods including an instruction device. The instruction device may implement a function specified in a flow or flows in a flowchart and/or a block or blocks in a block diagram.

These computer program instructions may also be loaded onto a computer or other programmable information processing device, such that a series of operational steps are performed on the computer or other programmable information processing device to produce computer-implemented processing. Instructions executed on a computer or other programmable device may provide steps to implement a function specified in a flow or flows in a flowchart and/or a block or blocks in a block diagram.

Obviously, one skilled in the art may make various changes and variations to the present disclosure without deviating from the spirit and scope of the present disclosure. Thus, to the extent that these modifications and variations of the present disclosure fall within the scope of the claims of the present disclosure and their equivalents, the present disclosure is also intended to include such modifications and variations.

What is claimed is:

1. A method for switching a main microphone of a plurality of microphones, comprising:
   acquiring first audio data for playback by a loudspeaker, and acquiring second audio data acquired by each microphone and noise frequency domain energy corresponding to each microphone;
   preprocessing the first audio data and the second audio data, obtaining corresponding first frequency domain data and second frequency domain data;
   calculating first frequency domain energy of the first frequency domain data and second frequency domain energy of the second frequency domain data;
   when the first frequency domain energy is less than a first preset threshold, selecting a candidate main microphone from the plurality of microphones according to the noise frequency domain energy and the second frequency domain energy corresponding to each microphone; and
   when the candidate main microphone is different from the current main microphone, switching the candidate main microphone as the main microphone.

2. The method for switching the main microphone of the plurality of microphones of the plurality of microphones of claim 1, wherein when acquiring the first audio data for playback by the loudspeaker, a frame number of acquired audio data is 1; and
   when acquiring the second audio data acquired by each microphone, a frame number of acquired audio data is 1.

3. The method for switching the main microphone of the plurality of microphones of claim 2, wherein acquiring the noise frequency domain energy corresponding to each microphone comprises:
   for each microphone, when a frame number of audio data that have been acquired by the microphone is greater than or equal to a preset number, determining the newest frames of the audio data that have been acquired with the preset number, preprocessing each frame of the newest frames of the audio data to obtain corresponding third frequency domain data, calculating third frequency domain energy of the third frequency domain data, and taking a minimum third frequency domain energy as the noise frequency domain energy corresponding to the microphone.

4. The method for switching the main microphone of the plurality of microphones of claim 1, wherein when the first frequency domain energy is less than the first preset threshold, selecting the candidate main microphone from the plurality of microphones according to the noise frequency domain energy and the second frequency domain energy corresponding to each microphone comprises:
   when the first frequency domain energy is less than the first preset threshold, and at least one of the second frequency domain energy is greater than a second preset threshold, calculating a signal-to-noise ratio corresponding to each microphone based on the noise frequency domain energy and the second frequency domain energy corresponding to each microphone, and selecting a microphone with a maximum signal-to-noise ratio as the candidate main microphone; or
   when the first frequency domain energy is less than the first preset threshold, and each of the second frequency domain energy is less than the second preset threshold, selecting a microphone with minimum noise frequency domain energy as the candidate main microphone.

5. The method for switching the main microphone of the plurality of microphones of claim 1, wherein when the candidate main microphone is different from the current main microphone, and before switching the candidate main microphone as the main microphone, the method further comprises:
   updating a count corresponding to the candidate main microphone to the current count plus one;
   when the updated count reaches a threshold, switching the candidate main microphone to the main microphone;
   when the updated count is less than the threshold, returning to perform steps of acquiring the first audio data for playback by the loudspeaker, and acquiring the second audio data acquired by each microphone and the noise frequency domain energy corresponding to each microphone.

6. The method for switching the main microphone of the plurality of microphones of claim 5, wherein after switching the candidate main microphone as the main microphone, the method further comprises:

resetting the count corresponding to each candidate main microphone other than the main microphone, and returning to perform steps of acquiring the first audio data for playback by the loudspeaker, and acquiring the second audio data acquired by each microphone and the noise frequency domain energy corresponding to each microphone.

7. The method for switching the main microphone of the plurality of microphones of claim 5, further comprising:
when the first frequency domain energy is greater than the first preset threshold, resetting the count corresponding to each candidate main microphone that has been selected, and returning to perform steps of acquiring the first audio data for playback by the loudspeaker, and acquiring the second audio data acquired by each microphone and the noise frequency domain energy corresponding to each microphone.

8. The method for switching the main microphone of the plurality of microphones of claim 1, wherein the number of the microphone is denoted as N, after acquiring the second audio data acquired by each microphone, the method further comprises:
performing voice activity detection on N second audio data, determining X second audio data to be voice frames, and determining Y second audio data to be noise frames, wherein X plus Y is equal to N, both X and Y are integers greater than or equal to 0, and N is an integer greater than 0;
when both X and Y are not equal to 0, detecting whether the N second audio data contain a fundamental frequency of voice and a harmonic; and
when any one of the N second audio data contains the fundamental frequency of voice and the harmonic, identifying the second audio data acquired by each microphone as voice data.

9. The method for switching the main microphone of the plurality of microphones of claim 8, wherein a uniform ring microphone array is defined by N microphones, and each microphone is a directional microphone with an angle of 360°/N.

10. The method for switching the main microphone of the plurality of microphones of claim 8, wherein after performing the voice activity detection on the N second audio data, determining X second audio data to be voice frames, and determining Y second audio data to be noise frames, the method further comprises:
when Y is equal to 0, identifying the second audio data acquired by each microphone as voice data.

11. The method for switching the main microphone of the plurality of microphones of claim 8, wherein after performing voice activity detection on the N second audio data, determining X second audio data to be voice frames, and determining Y second audio data to be noise frames, the method further comprises:
when X is equal to 0, identifying the second audio data acquired by each microphone as noise data.

12. The method for switching the main microphone of the plurality of microphones of claim 8, wherein after identifying the second audio data acquired by each microphone as voice data, the method further comprises:
selecting the second audio data with a maximum signal-to-noise ratio from the N second audio data to perform voice recognition.

13. An apparatus for switching a main microphone of a plurality of microphones, comprising an acquiring unit, a preprocessing unit, a first calculating unit, a second calculating unit, and a switching unit;
the acquiring unit is configured for acquiring first audio data for playback by a loudspeaker, and acquiring second audio data acquired by each microphone and noise frequency domain energy corresponding to each microphone;
the preprocessing unit is configured for preprocessing the first audio data and the second audio data, obtaining corresponding first frequency domain data and second frequency domain data;
the first calculating unit is configured for calculating first frequency domain energy of the first frequency domain data and second frequency domain energy of the second frequency domain data;
the second calculating unit is configured for selecting a candidate main microphone from the plurality of microphones according to the noise frequency domain energy and the second frequency domain energy corresponding to each microphone when the first frequency domain energy is less than a first preset threshold; and
the switching unit is configured for switching the candidate main microphone as the main microphone when the candidate main microphone is different from the current main microphone.

14. A voice detection method for a microphone, comprising:
acquiring a local audio signal by N microphone at corresponding angles to obtain corresponding N second audio data, wherein each second audio data comprises an audio frame;
performing voice activity detection on the N second audio data, determining X second audio data to be voice frames, and determining Y second audio data to be noise frames, wherein X plus Y is equal to N, both X and Y are integers greater than or equal to 0, and N is an integer greater than 0;
when both X and Y are not equal to 0, detecting whether the N second audio data contain a fundamental frequency of voice and a harmonic; and
when any one of the N second audio data contains the fundamental frequency of voice and the harmonic, identifying the local audio signal as a voice signal.

15. The voice detection method for the microphone of claim 14, wherein a uniform ring microphone array is defined by the N microphones, and each microphone is a directional microphone with an angle of 360°/N.

16. The voice detection method for the microphone of claim 14, wherein after performing voice activity detection on the N second audio data, determining X second audio data to be voice frames, and determining Y second audio data to be noise frames, the method further comprises:
when Y is equal to 0, identifying the local audio signal as the voice signal.

17. The voice detection method for the microphone of claim 14, wherein after performing voice activity detection on the N second audio data, determining X second audio data to be voice frames, and determining Y second audio data to be noise frames, the method further comprises:
when X is equal to 0, identifying the local audio signal as a noise signal.

18. The voice detection method for the microphone of claim 14, wherein after identifying the local audio signal as the voice signal, the method further comprises:
selecting the second audio data with a maximum signal-to-noise ratio from the N second audio data to perform voice recognition.

19. A microphone-loudspeaker integrated device, comprising at least one processor and a memory communicatively connected to the at least one processor, wherein the memory stores instructions executable by the at least one processor, and the instructions are executed by the at least one processor to implement the steps of the method for switching the main microphone of the plurality of microphones of claim 1.

20. A microphone-loudspeaker integrated device, comprising at least one processor and a memory communicatively connected to the at least one processor, wherein the memory stores instructions executable by the at least one processor, and the instructions are executed by the at least one processor to implement the steps of the voice detection method for the microphone of claim 14.

* * * * *